(12) United States Patent
Takahashi et al.

(10) Patent No.: US 6,781,648 B2
(45) Date of Patent: Aug. 24, 2004

(54) LIQUID-CRYSTAL DISPLAY DEVICE

(75) Inventors: Yuji Takahashi, Nishikasugai-gun (JP); Kanae Matsumura, Nishikasugai-gun (JP); Hideaki Kato, Nishikasugai-gun (JP); Koichi Kaga, Nishikasugai-gun (JP)

(73) Assignee: Toyoda Gosei Co., Ltd., Nishikasugai-gun (JP)

( * ) Notice: Subject to any disclaimer, the term of this patent is extended or adjusted under 35 U.S.C. 154(b) by 0 days.

(21) Appl. No.: 10/015,624

(22) Filed: Dec. 17, 2001

(65) Prior Publication Data

US 2002/0080301 A1 Jun. 27, 2002

(30) Foreign Application Priority Data

Dec. 22, 2000 (JP) .................................. P. 2000-391713

(51) Int. Cl.[7] ............................................ G02F 1/1335
(52) U.S. Cl. ...................................... 349/68; 349/50
(58) Field of Search ....................... 349/50, 68; 362/26, 362/27, 31; 385/901

(56) References Cited

U.S. PATENT DOCUMENTS

| | | | | | |
|---|---|---|---|---|---|
| 5,008,658 A | * | 4/1991 | Russay et al. | ................ | 345/87 |
| 5,008,788 A | * | 4/1991 | Palinkas | ...................... | 362/231 |
| 5,130,828 A | * | 7/1992 | Fergason | ...................... | 349/199 |
| 5,164,715 A | * | 11/1992 | Kashiwabara et al. | ......... | 345/4 |
| 5,377,027 A | * | 12/1994 | Jelley et al. | .................. | 349/69 |
| 5,835,269 A | * | 11/1998 | Natori | ........................ | 359/448 |
| 6,007,209 A | * | 12/1999 | Pelka | ........................... | 362/30 |
| 6,069,676 A | * | 5/2000 | Yuyama | ........................ | 349/62 |
| 6,104,446 A | * | 8/2000 | Blankenbecler et al. | ....... | 349/5 |
| 6,185,016 B1 | * | 2/2001 | Popovich | ..................... | 359/15 |
| 6,386,720 B1 | * | 5/2002 | Mochizuki | .................... | 362/27 |

FOREIGN PATENT DOCUMENTS

JP 2000-241811 9/2000

* cited by examiner

*Primary Examiner*—Kenneth Parker
*Assistant Examiner*—David Y. Chung
(74) *Attorney, Agent, or Firm*—McGinn & Gibb, PLLC

(57) ABSTRACT

A light source in a backlight portion is composed of red LEDs, green LEDs, and blue LEDs. The numbers of respective kinds of LEDs used are selected so that the number of blue LEDs is not smaller than the number of red LEDs and the number of blue LEDs is not smaller than the number of green LEDs.

27 Claims, 6 Drawing Sheets

LIQUID-CRYSTAL DISPLAY DEVICE

BACKGROUND OF THE INVENTION

1. Field of the Invention

The present invention relates to a liquid-crystal display device and particularly to improvement in a backlight portion of a color-filterless liquid-crystal display device.

2. Description of the Related Art

A field-sequential liquid-crystal display device is heretofore known as a color-filterless liquid-crystal display device (see JP-A-2000-241811). According to the JP-A-2000-241811, the field-sequential liquid-crystal display device has been described as follows.

That is, the field-sequential liquid-crystal display device is constituted by a backlight for emitting light selected from light beams of three primary colors R, G and B, and a liquid-crystal shutter display panel. The liquid-crystal shutter display panel includes a pair of polarizing plates, and a liquid-crystal cell sandwiched between the pair of polarizing plates. A specific region of the liquid-crystal cell is opened as a translucent region selectively in synchronism with light emitted from the backlight, so that the light emitted from the backlight is displayed in the form of a predetermined display pattern. Such light beams of three primary colors selectively emitted from the backlight and such display patterns on the liquid-crystal shutter display panel are switched sequentially at a high speed to overlay respective display patterns of R, G and B continuously in a time division mode at a high speed to thereby perform color display. When, for example, only one color of R, G and B is expressed in a specific region, the color can be displayed in the region. When two colors of R, G and B are expressed successively in another specific region so as to be overlaid while switched at a high speed, a mixture color of the two colors by additive color mixture can be displayed in the region. When three colors R, G and B are expressed successively in a further region so as to be overlaid while switched at a high speed, a mixture color of the three colors by additive color mixture can be displayed in the region.

In the invention described in the JP-A-2000-241811, an electroluminescence (EL) was used as the backlight of the field-sequential liquid-crystal display device. The present inventors have investigated eagerly LEDs (LEDs) used as the backlight. As a result, the following problem to be solved has been found.

At present, red LEDs, green LEDs and blue LEDs are available on the market. The luminous efficiencies of these LEDs are different from one another in accordance with emission colors. Accordingly, it is necessary to adjust power (load) applied to the LEDs of the respective colors in accordance with colors when these LEDs form a full color backlight. (When, for example, the blue LED is assumed to have a brightness of 1, the brightness of the green LED and the brightness of the red LED are 6 and 3 respectively.) In this case, degradation of a LED upon which a large load is imposed is accelerated. The color balance emitted from the backlight may be lost with the passage of time.

According to the inventors' research, it has been found that there is a tendency that bluish white is selected as the background color (white) of a color display.

When Twisted Nematic (TN) liquid crystal, Super Twisted Nematic (STN) liquid crystal or the like is used as a liquid crystal material in a color-filterless liquid-crystal panel of a field-sequential liquid-crystal display device or the like, the color of the cell is selected to be green. Hence, green is visually recognized relatively intensively if the backlight contains the three primary colors equal in intensity.

SUMMARY OF THE INVENTION

The present invention is devised to solve the aforementioned problem. Configuration according to a first aspect of the present invention is a color-filterless full color liquid-crystal display device provided with a liquid-crystal shutter portion and a backlight portion, the liquid-crystal shutter portion including TN liquid crystal or STN liquid crystal; the backlight portion including red LEDs, green LEDs and blue LEDs; wherein the number of the blue LEDs is not smaller than the number of the red LEDs; and the number of the blue LEDs is not smaller than the number of the green LEDs.

According to the liquid-crystal display device configured as described above, the number of the blue LEDs used is not smaller than the number of any other color type of LEDs used. The light source color of the backlight becomes bluish, so that the power load applied to the blue LEDs can be set to be smaller. Hence, such a backlight can be adapted to users' needs because the backlight can be kept bluish as required in total even in the case where light is transmitted through a greenish liquid-crystal cell made of TN or STN liquid crystal.

According to another aspect of the present invention, the numbers of the respective LEDs used are determined, so that the number of the green LEDs is not larger than the number of the red LEDs; and the number of the green LEDs is not larger than the number of the blue LEDs.

When the light source of the backlight is configured as described above, the green component contained in the backlight is weakened relatively. On the other hand, the liquid crystal material in the liquid-crystal shutter portion is greenish. Hence, the attenuation of the green component of backlight transmitted through the liquid crystal material becomes the smallest, so that the green component is balanced finally.

Constituent members of the present invention will be described below.

A configuration in which a liquid-crystal cell having a shutter function is sandwiched between a pair of polarizing plates can be used as the liquid-crystal shutter portion. On this occasion, the liquid-crystal cell has a pair of transparent substrates, a pair of transparent electrodes formed on surfaces of the transparent substrates facing each other, a pair of alignment films formed on the transparent electrodes respectively, a sealing material for joining and sealing the circumferential edges of the transparent substrates while keeping the distance between the transparent substrates constant, and liquid crystal enclosed in an enclosure space formed between the transparent substrates.

Each of the polarizing plates can be provided with polarizing layers having linear polarization axes crossing each other perpendicularly. A glass substrate or a plastic substrate can be used as each of the transparent substrates. The liquid crystal enclosed in the liquid-crystal cell is made of a liquid crystal material such as TN liquid crystal or STN liquid crystal, which exhibits green.

Each of the alignment films is provided to align liquid-crystal molecules in a specific direction on a surface and can be formed by rubbing a surface of a film of a heat-resistant resin such as polyimide in the specific direction with a piece of cloth made of nylon or the like.

Each of the transparent electrodes can be made of ITO, AZO (Al-added ZnO), $SnO_2$, or the like. Each of the transparent electrodes is constituted by a predetermined pattern shaped like stripes. The molecular alignment of the liquid crystal is changed only in a specific region constituted by dot units by application of a voltage to the dot units, so that light-transmittance can be changed only in the region on the basis of the relation between a pair of polarizing layers.

In a field-sequential type liquid-crystal display device, a specific region is selectively opened as a translucent region in synchronism with light emitted from the backlight to thereby display the light emitted from the backlight in the form of a predetermined display pattern. Light beams of the three primary colors selectively emitted from the backlight and display patterns on the liquid-crystal shutter display panel are switched successively at a high speed to express the display patterns of R, G and B continuously in a time division mode to thereby make color display possible.

The light source of the backlight portion is constituted by red LEDs, green LEDs, and blue LEDs. Here, each of the red LEDs emits light with a wavelength of from 600 to 620 nm and, for example, is made of a GaP type compound semiconductor. Each of the green LEDs emits light with a wavelength of from 510 to 550 nm and, for example, is made of a GaN type compound semiconductor. Each of the blue LEDs emits light with a wavelength of from 460 to 480 nm and, for example, is made of a GaN type compound semiconductor.

The use of the LEDs as the light source permits improvement of light-emitting efficiency and saving of consumed electric power compared with the use of a cold cathode fluorescent tube or the like as the light source. Moreover, heat generated in the LEDs is small so that the influence of heat on the light guide can be reduced. In addition, the life of the LEDs is long so that the life of the light source can be intended to become longer.

In the present invention, the numbers of the respective LEDs used in the light source are determined, so that the number of the blue LEDs is not smaller than the number of the red LEDs; and the number of the blue LEDs is not smaller than the number of the green LEDs.

In this configuration, the blue component is intensified in the backlight. When the respective LEDs are switched on simultaneously, bluish white light emission is obtained. Also when the respective LEDs are switched on in a time division mode in field-sequential control, light is perceived as bluish white because blue light emission is intensive. Accordingly, natural white with blue balance adjusted is obtained when the backlight is transmitted through the greenish cell of the liquid-crystal shutter portion.

In consideration of green of the cell, the further preferred numbers of the respective LEDs arranged are determined, so that the number of the blue LEDs is not smaller than the number of the red LEDs; and the number of the blue LEDs is larger than the number of the green LEDs.

According to a further aspect of the present invention, the numbers of the respective LEDs are also determined, so that the number of the green LEDs is not larger than the number of the red LEDs; and the number of the green LEDs is not larger than the number of the blue LEDs.

The backlight portion includes a light guide having a surface facing the liquid-crystal shutter portion. Light is led into the light guide from the respective LEDs described above. In the embodiment described later, there is employed a configuration in which a planar light guide is laminated on the liquid-crystal shutter portion so that light from the respective LEDs is led into the light guide through a side surface of the light guide. Examples of the translucent material constituting the light guide include: a synthetic resin such as polycarbonate, acrylic resin, epoxy resin, etc.; and an inorganic material such as glass, etc. It is preferable that a reflection layer is formed on any other surface of the light guide except the surface facing the liquid-crystal shutter portion. The reflection layer can be also formed by printing, evaporation or sputtering using light-reflective ink (for example, white ink). Alternatively, a tape (such as a white tape) with a high light reflectance may be pasted on the surface. Alternatively, the reflection surface may be formed by a surface-roughening process such as etching, sandblasting, electric discharge machining, or the like.

Preferably, a light-diffusing layer is interposed between the light guide and the liquid-crystal shutter portion. The light guide, the light-diffusing layer interposed thus as occasion demands, and the liquid-crystal shutter portion are preferably stuck close to one another.

The backlight portion includes a light emission controller by which a current is applied to each of the LEDs to obtain the maximum light-emitting efficiency of the LED. That is, the LEDs are operated in rated conditions respectively. As a result, the respective LEDs are made substantially uniform in the progress of degradation thereof, so that color balance is never lost even with the passage of time.

The light emission controller switches on the LEDs in accordance with the colors in synchronism with the ON/OFF of the cell in the liquid-crystal shutter portion to thereby perform a field-sequential liquid-crystal display mode.

DETAILED DESCRIPTION OF THE PREFERRED EMBODIMENTS

An embodiment of the present invention will be described below.

Figure 1:
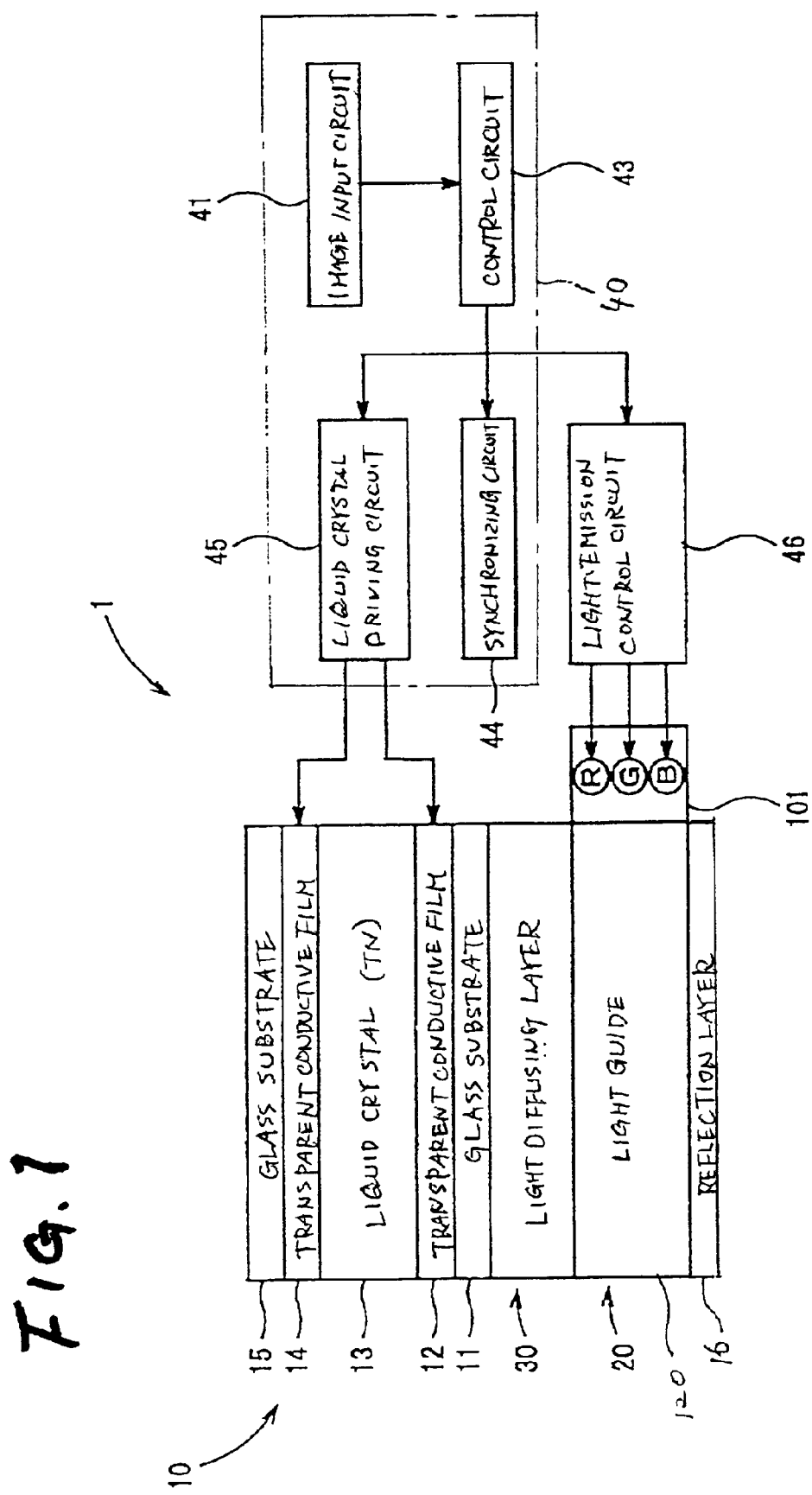
FIG. 1 shows the configuration of a liquid-crystal display device according to an embodiment of the present invention.

FIG. 1 shows the configuration of a field-sequential liquid-crystal display device 1 according to this embodiment. In this embodiment, the liquid-crystal display device 1 is constituted by a liquid-crystal shutter portion 10, a backlight portion 20, a light-diffusing layer 30, and a control portion 40.

The liquid-crystal shutter portion 10 has a versatile configuration. A first glass substrate 11, a first transparent conductive film 12 made of an ITO film, liquid crystal 13 made of a TN material, a second transparent conductive film 14 made of an ITO film and a second glass substrate 15 are laminated successively to form the liquid-crystal shutter portion 10. Each of the first and second transparent conductive films 12 and 14 is shaped like a matrix. A voltage is applied to each of the first and second transparent conductive films 12 and 14 to thereby control a corresponding region of the liquid-crystal cell to be translucent/non-translucent.

Figure 2:
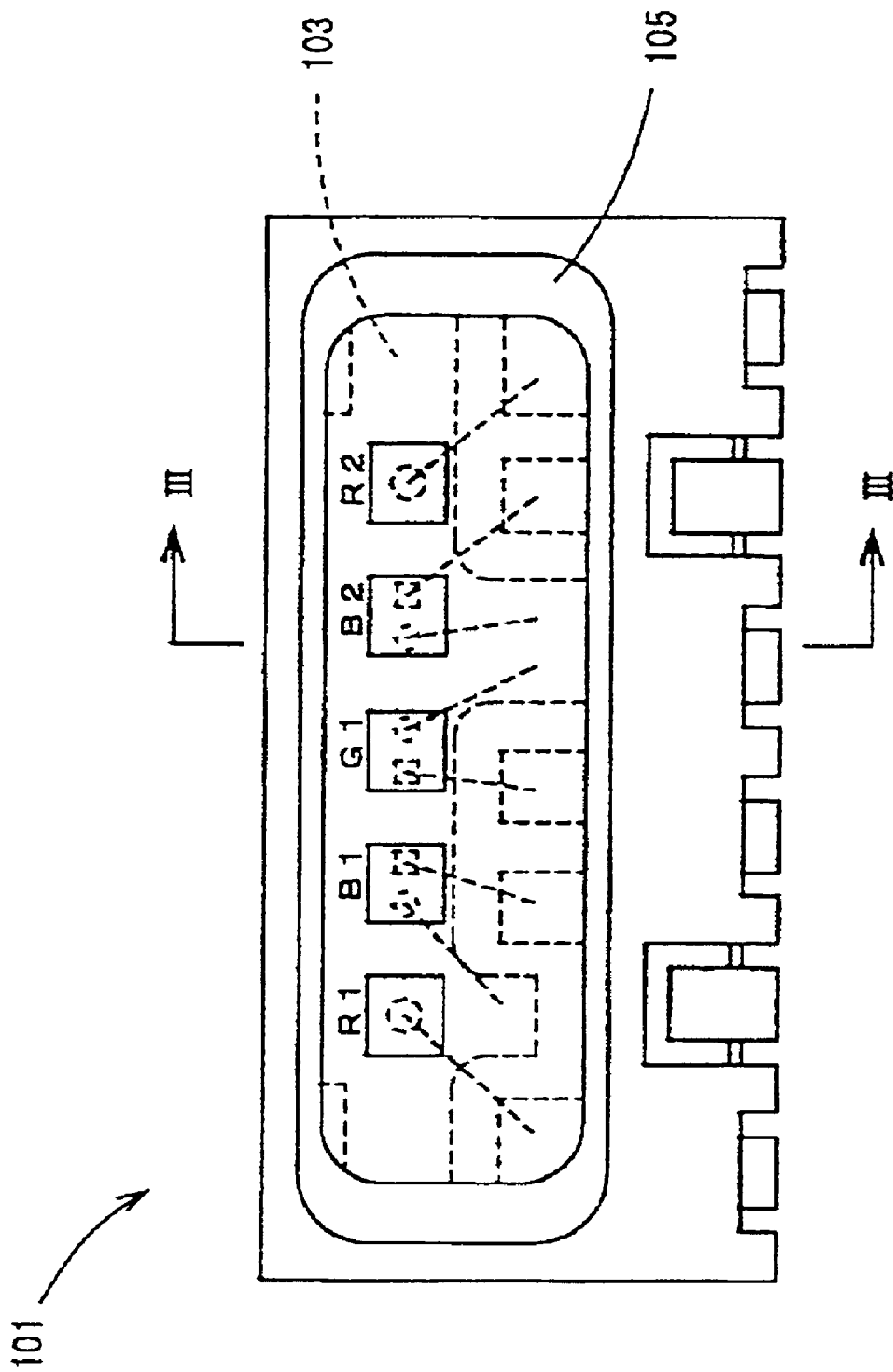
FIG. 2 is a front view of a backlight light source in this embodiment.
Figure 3:
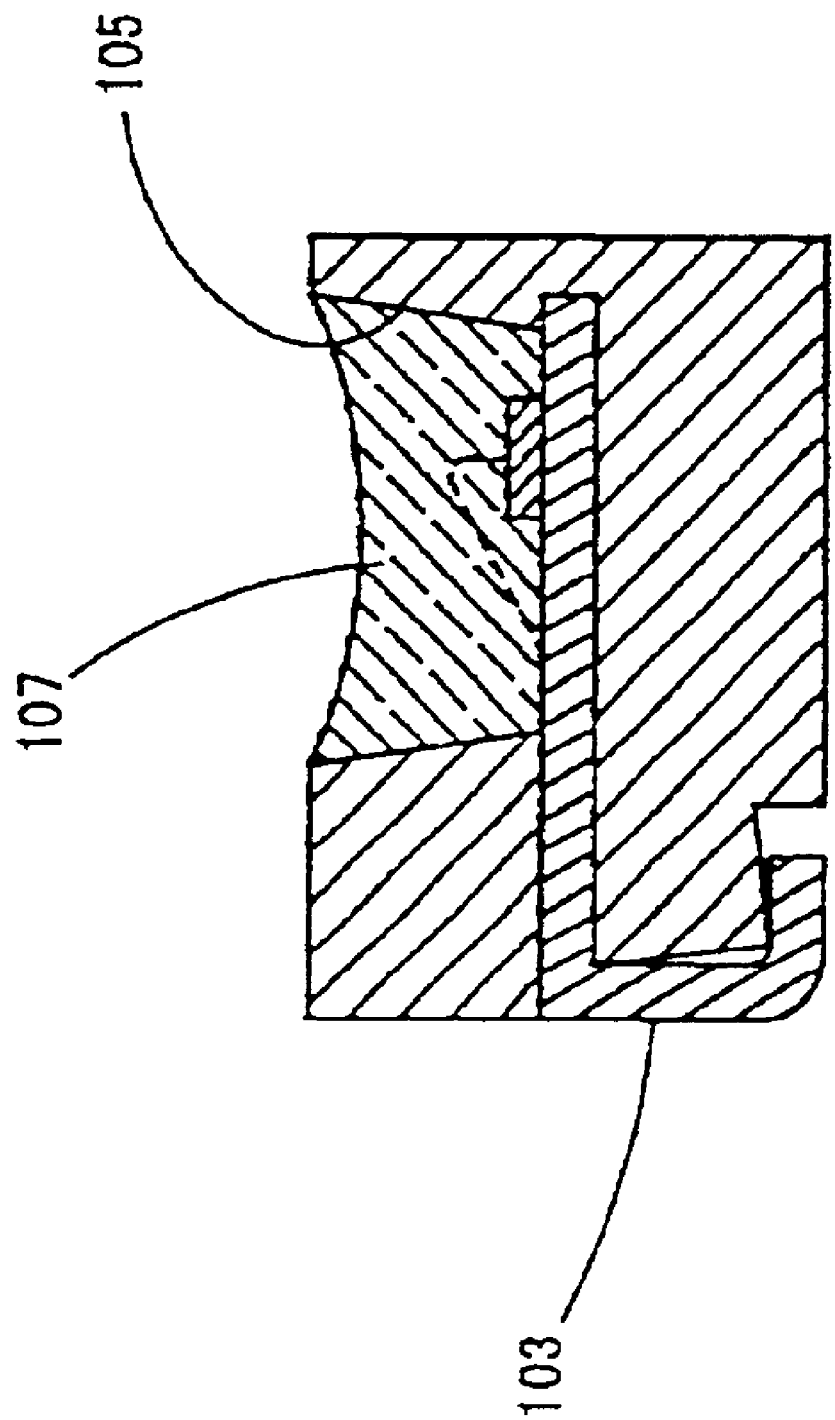
FIG. 3 is a sectional view taken along the line III—III in FIG. 2.

The backlight portion 10 includes light source units 101, and a light guide 120. One of the light source units 101 is shown in FIG. 2. FIG. 3 is a sectional view taken along the line III—III in FIG. 2.

Figure 4:
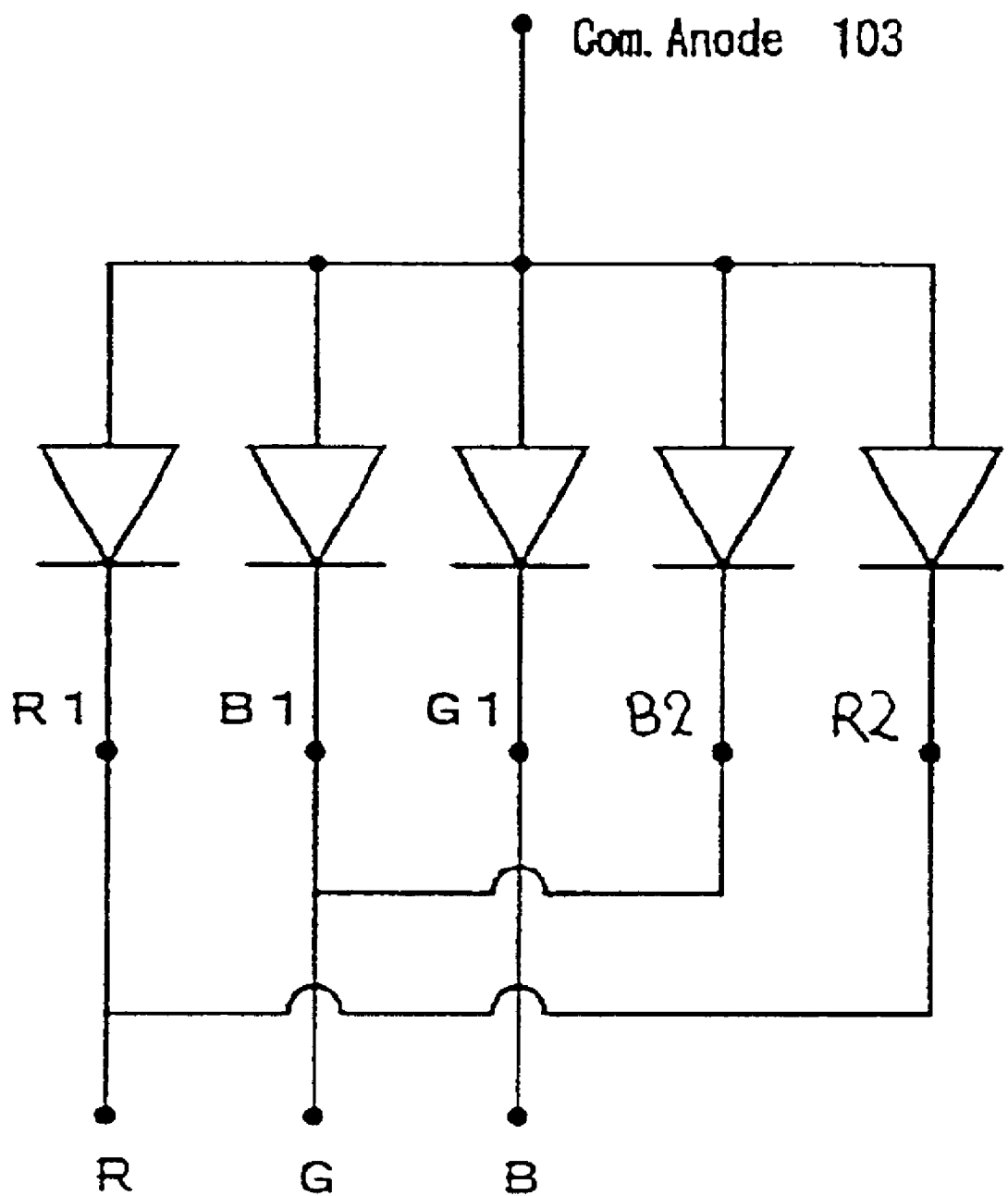
FIG. 4 is a wiring diagram of LEDs.

A green LED G1 is disposed in the center of the light source unit 101. Two blue LEDs B1 and B2 are disposed on opposite sides of the green LED G1. Two red LEDs R1 and R2 are disposed on opposite sides of the blue LEDs. These five LEDs are aligned in a line. Wiring for the respective LEDs is shown in FIG. 4. It is to be understood from the wiring in FIG. 4 that the first and second blue LEDs B1 and B2 are switched on simultaneously or off simultaneously. Similarly, the first and second red LEDs R1 and R2 are switched on/off simultaneously.

A GaN type diode is used as each of the blue and green LEDs. An AlInGaP type diode is used as each of the red LEDs.

As shown in FIG. 3, the respective LEDs are mounted directly on a common anode (p-type electrode) 103 in a cup-shaped window 105. An insulating substrate is used for each of the blue and green LEDs, so that a conductive wire is laid between the common anode 103 and a p-type layer of the common anode 103. The window 105 is surrounded by a wall which serves as a reflection surface. The window 105 is filled with a transparent resin 107.

Figure 5:
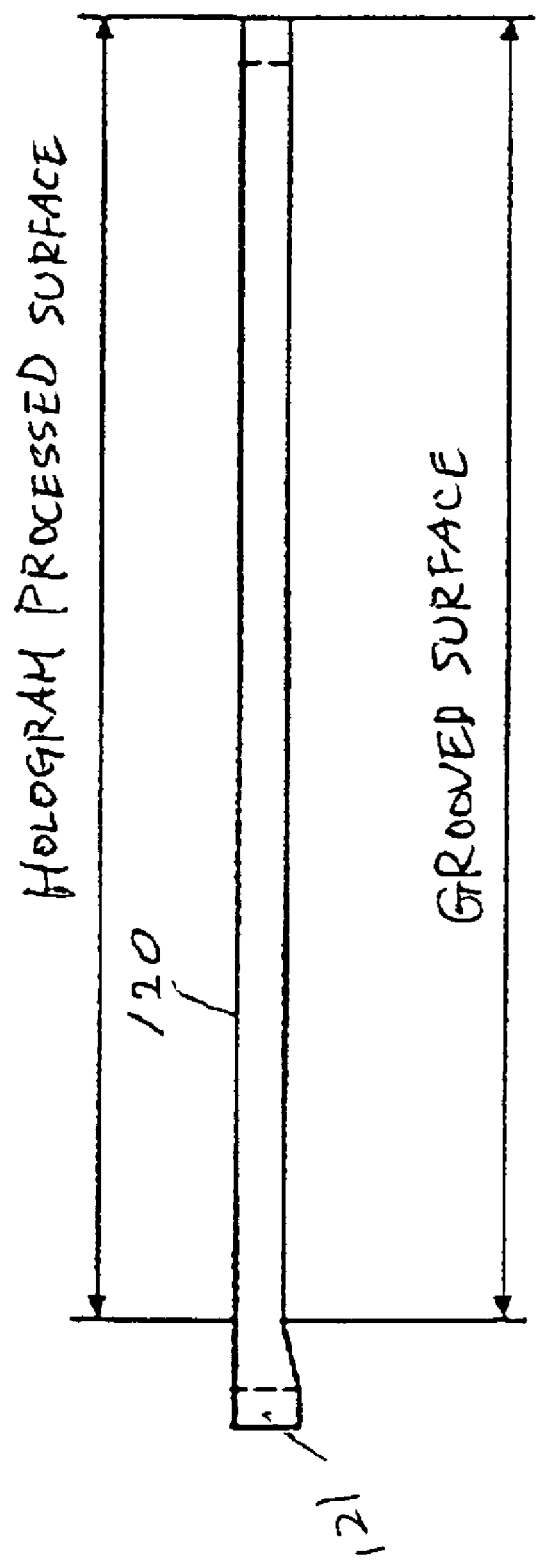
FIG. 5 is a front view of a light guide.
Figure 6:
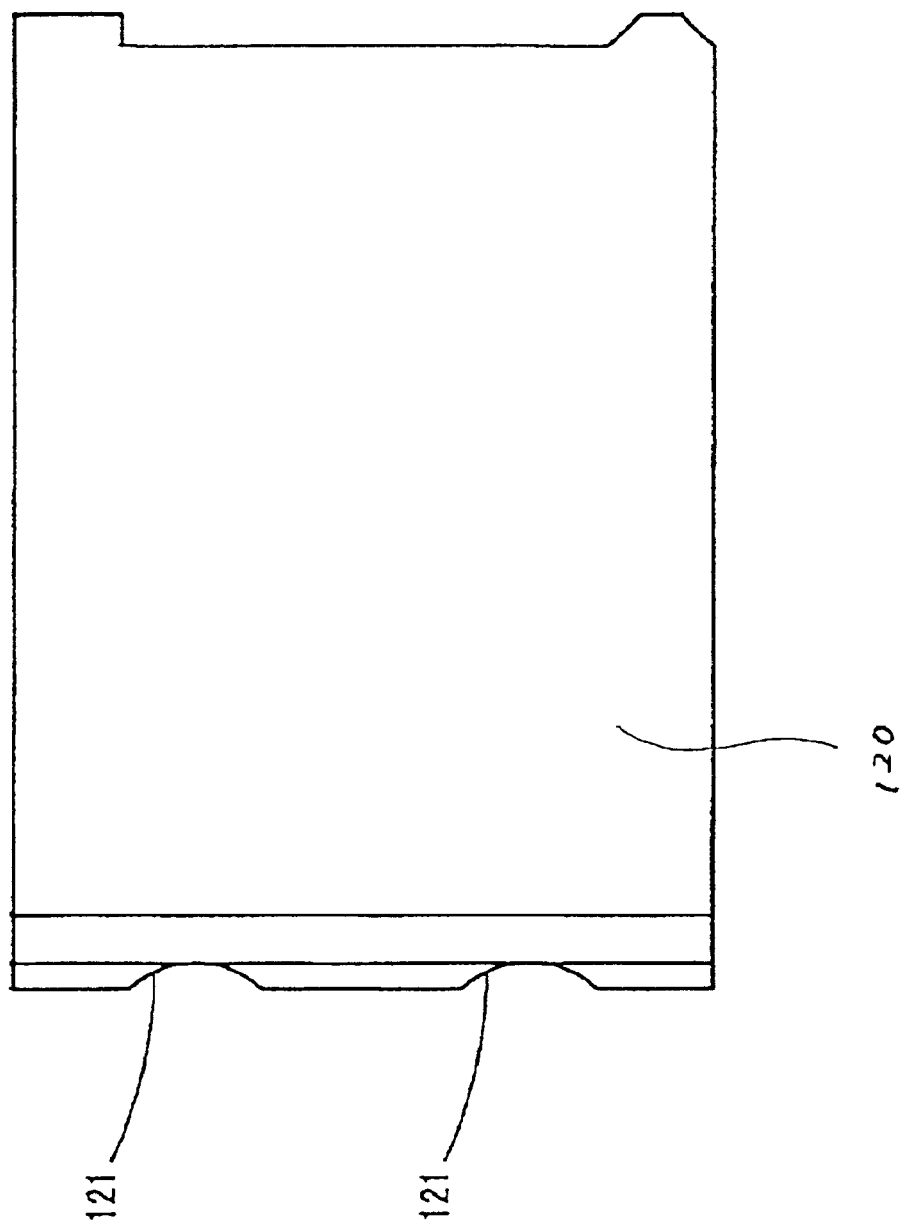
FIG. 6 is a plan view of the light guide.

As shown in FIGS. 5 and 6, the light guide 120 is shaped like a plate (film). The left end of the light guide 120 is slightly thicker than the other portions thereof as shown in FIG. 5. Notches (light source unit mount portions) 121 are formed in the left end of the light guide 120. The light source unit 101 is mounted in each of the notches 121 so that the window 105 faces the light guide 120. The light guide 120 is made of a transparent resin (epoxy resin). On the lower surface of the light guide 120, as shown in FIG. 1, a reflection layer 16 is provided as a grooved surface and the upper surface (the side surface of the liquid-crystal shutter portion) of the light guide 120 is provided as a fine hologram processed surface.

A side surface of the light guide 120 is painted with white or a white member is provided on a side surface of the light guide 120 so that the side surface also serves a reflection layer.

In the backlight portion 20 configured as described above, light beams emitted from the LEDs G, R1, R2, B1 and B2 are led into the light guide 120 through the side surface of the light guide 120. The light beams are reflected upward by the lower surface (the grooved surface) of the light guide 120 so as to be emitted from the upper surface (the hologram processed surface) of the light guide 120 toward the liquid-crystal shutter portion 10.

The light-diffusing layer 30 is interposed between the light guide 120 and the liquid-crystal shutter portion 10. The light-diffusing layer 30 is made of a uniform dispersion of a light-diffusing agent (such as mica) in a translucent resin (such as epoxy resin). The intensity of light beams incident on the liquid-crystal shutter portion 10 is made uniform by the light-diffusing layer 30.

In the control portion 40, a control circuit 43 sends an image signal to a liquid-crystal driving circuit 45 in accordance with an image (of characters, graphics, etc.) formed by an image input circuit 41. The liquid-crystal driving circuit 45 turns on/off the transparent conductive films 12 and 14 on the basis of the input image signal to thereby drive regions of the liquid-crystal cell corresponding to the image. The liquid-crystal driving circuit 45 is synchronized with a light emission control circuit 46 by a synchronizing circuit 44. As a result, the LEDs of respective colors are switched on in a time division mode, so that the regions of the liquid-crystal cell are controlled to be switched on/off in synchronism with the time-division switching of the LEDs. A known configuration can be used as the control portion 40.

The light emission control circuit 46 applies a current to each of the LEDs to maximize its light-emitting efficiency to thereby operate the LED in a rated condition.

According to the liquid-crystal display device 1 configured thus in accordance with this embodiment, four blue LEDs, four red LEDs and two green LEDs are used in total as light sources of the backlight portion and operated in rated conditions respectively. Because the number of the green LEDs is smallest, green may be poor as backlight. Green TN is, however, used in the liquid crystal 13, so that attenuation of the green component of light is smallest when the light passes through the liquid crystal 13. Accordingly, green is balanced when the light is viewed finally. Because the number of the blue LEDs used is large, bluish white in great demand can be achieved easily particularly when white is to be generated.

The present invention is not limited to the above description of the mode for carrying out the invention and of the embodiment thereof at all, but includes various modifications that can be conceived easily by those skilled in the art, without departing from the description of the scope of claim.

What is claimed is:

1. A color-filterless full color liquid-crystal display device, comprising:
    a liquid-crystal shutter portion including a liquid crystal; and
    a backlight portion including light source units and a planar light guide, wherein said light source units comprise at least one red light-emitting device (LED), at least one green LED, and at least one blue LED,
    wherein a first number corresponding to said at least one blue LED is not smaller than a second number corresponding to said at least one red LED, and the first number corresponding to said at least one blue LED is not smaller than a third number corresponding to said at least one green LED,
    wherein said light source units are disposed on an edge of said planar light guide, and
    wherein the number of said blue LEDs is not smaller than the number of said red LEDs and the number of said blue LEDs is larger than the number of said green LEDs.

2. A color-filterless full color liquid-crystal display device, comprising:
    a liquid-crystal shutter portion including a liquid crystal; and
    a backlight portion including light source units and a planar light guide,
        wherein said light source units comprise at least one red light-emitting device (LED), at least one green LED, and at least one blue LED,
        wherein a first number corresponding to said at least one blue LED is not smaller than a second number corresponding to said at least one red LED, and the first number corresponding to said at least one blue LED is not smaller than a third number corresponding to said at least one green LED,
        wherein said light source units are disposed on an edge of said planar light guide, and
        wherein two red LEDs, one green LED and two blue LEDs are mounted on a substrate.

3. A color-filterless fall color liquid-crystal display device, comprising:

a liquid-crystal shutter portion including a liquid crystal; and a backlight portion including light source units and a planar light guide, wherein said light source units comprise at least one red light-emitting device (LED), at least one green LED, and at least one blue LED, wherein a first number corresponding to said at least one green LED is not larger than a second number corresponding to said at least one red LED and the first number corresponding to said at least one green LED is not larger than or equal to a third number corresponding to said at least one blue LED, wherein said light source units are disposed on an edge of said planar light guide, and wherein two red LEDs, one green LED and two blue LEDs are mounted on a substrate.

4. A liquid-crystal display device according to claim 3, wherein said backlight portion includes a planar light guide laminated on said liquid-crystal shutter portion so that said at least one red LED, said at least one green LED, and said at least one blue LED are disposed to face a side of said planar light guide.

5. A liquid-crystal display device according to claim 3, wherein a reflection layer is formed on a surface of said planar light guide.

6. A liquid-crystal display device according to claim 3, wherein said backlight portion includes a light emission controller for controlling light emission of each of said at least one red LED, said at least one green LED, and said at least one blue LED, said light emission controller applying a current to said each of said at least one red LED, said at least one green LED, and said at least one blue LED to thereby obtain a maximum light-emitting efficiency of said each of said at least one red LED, said at least one green LED, and said at least one blue LED.

7. A liquid-crystal display device according to claim 3, wherein light is selectively emitted from each of said at least one red LED, said at least one green LED, and said at least one blue LED in synchronization with an ON/OFF of a corresponding one of a plurality of pixels in said liquid-crystal shutter portion.

8. A color-filterless full color liquid-crystal display device, comprising:

a liquid-crystal shutter portion including a twisted nematic (TN) liquid crystal; and a backlight portion including light source units and a planar lightguide, wherein said light source units comprise at least one red light-emitting device (LED), at least one green LED, and at least one blue LED, wherein a first number corresponds to said at least one blue LED, a second number corresponds to said at least one red LED, and third number corresponds to said at least one green LED, and said second number is larger than at least one of said first number and said third number, and wherein said light source units are disposed on an edge of said planar light guide.

9. A color-filterless full color liquid-crystal display device, comprising:

a liquid-crystal shutter portion including a super twisted nematic (STN) liquid crystal; and a backlight portion including light source units and a planar lightguide, wherein said light source units comprise at least one red light-emitting device (LED), at least one green LED, and at least one blue LED, wherein a first number corresponding to said at least one blue LED is not smaller than a second number corresponding to said at least one red LED, and the first number corresponding to said at least one blue LED is larger than a third number corresponding to said at least one green LED, and wherein said light source units are disposed on an edge of said planar light guide.

10. A liquid-crystal display according to claim 3, wherein said liquid crystal comprises a TN liquid crystal.

11. A liquid-crystal display according to claim 3, wherein said liquid crystal comprises an STN liquid crystal.

12. A color-filterless full color liquid-crystal display device, comprising:

a liquid-crystal shutter portion including a liquid crystal; and a backlight portion including light source units and a light guide, wherein said light source units comprise at least one red light-emitting device (LED), at least one green LED, and at least one blue LED, wherein a first number corresponding to said at least one blue LED is not smaller than a second number corresponding to said at least one red LED, and the first number corresponding to said at least one blue LED larger than a third number corresponding to said at least one green LED, and wherein said light source units are disposed on an edge of said light guide.

13. A liquid-crystal display device according to claim 12, wherein said liquid crystal comprises a twisted nematic (TN) liquid crystal.

14. A liquid-crystal display device according to claim 12, wherein said liquid crystal comprises a super twisted nematic (STN) liquid crystal.

15. The color-filterless full color liquid-crystal display device according to claim 12, wherein said light guide comprises a planar light guide.

16. A color-filterless full color liquid-crystal display device, comprising:

a liquid-crystal shutter portion including a liquid crystal; and a backlight portion including light source units and a light guide, wherein said light source units comprise at least one red LED, at least one green LED, and at least one blue LED, wherein a first number corresponding to said at least one green LED is not larger than a second number corresponding to said at least one red LED and the first number corresponding to said at least one green LED is not larger than or equal to a third number corresponding to said at least one blue LED, and wherein said light source units are disposed on an edge of said light guide.

17. A liquid-crystal display device according to claim 16, wherein said liquid crystal comprises a twisted nematic (TN) liquid crystal.

18. A liquid-crystal display device according to claim 16, wherein said liquid crystal comprises a super twisted nematic (STN) liquid crystal.

19. The color-filterless full color liquid-crystal display device according to claim 16, wherein said light guide comprises a planar light guide.

20. A liquid-crystal display device according to claim 1, wherein said backlight portion includes a planar light guide laminated on said liquid-crystal shutter portion so that said at least one red LED, said at least one green LED, and said at least one blue LED are disposed to face a side of said planar light guide.

21. A liquid-crystal display device according to claim 20, wherein a reflection layer is formed on a surface of said planar light guide.

22. A liquid-crystal display device according to claim 1, wherein said backlight portion includes a light emission controller for controlling light emission of each of said at least one red LED, said at least one green LED, and said at least one blue LED, said light emission controller applying a current to said each of said at least one red LED, said at least one green LED, and said at least one blue LED to thereby obtain a maximum light-emitting efficiency of said each of said at least one red LED, said at least one green LED, and said at least one blue LED.

23. A liquid-crystal display device according to claim 1, wherein light is selectively emitted from each of said at least one red LED, said at least one green LED, and said at least one blue LED in synchronization with an ON/OFF of a corresponding one of a plurality of pixels in said liquid-crystal shutter portion.

24. A liquid-crystal display device according to claim 2, wherein said backlight portion includes a planar light guide laminated on said liquid-crystal shutter portion so that said at least one red LED, said at least one green LED, and said at least one blue LED are disposed to face a side of said planar light guide.

25. A liquid-crystal display device according to claim 24, wherein a reflection layer is formed on a surface of said planar light guide.

26. A liquid-crystal display device according to claim 2, wherein said backlight portion includes a light emission controller for controlling light emission of each of said at least one red LED, said at least one green LED, and said at least one blue LED, said light emission controller applying a current to said each of said at least one red LED, said at least one green LED, and said at least one blue LED to thereby obtain a maximum light-emitting efficiency of said each of said at least one red LED, said at least one green LED, and said at least one blue LED.

27. A liquid-crystal display device according to claim 2, wherein light is selectively emitted from each of said at least one red LED, said at least one green LED, and said at least one blue LED in synchronization with an ON/OFF of a corresponding one of a plurality of pixels in said liquid-crystal shutter portion.

* * * * *